United States Patent
Appalucci et al.

(10) Patent No.: US 7,583,194 B2
(45) Date of Patent: Sep. 1, 2009

(54) METHOD AND SYSTEM FOR TRACKING CONTAINERS HAVING METALLIC PORTIONS, COVERS FOR CONTAINERS HAVING METALLIC PORTIONS, TAGS FOR USE WITH CONTAINER HAVING METALLIC PORTIONS AND METHODS OF CALIBRATING SUCH TAGS

(75) Inventors: Lawrence Appalucci, Villanova, PA (US); Dave McGoldrick, West Chester, PA (US); Paul Roberts, Collingswood, NJ (US); George West, Swedesboro, NJ (US)

(73) Assignee: Checkpoint Systems, Inc., Thorofare, NJ (US)

( * ) Notice: Subject to any disclaimer, the term of this patent is extended or adjusted under 35 U.S.C. 154(b) by 842 days.

(21) Appl. No.: 11/119,857

(22) Filed: May 2, 2005

(65) Prior Publication Data

US 2006/0086808 A1    Apr. 27, 2006

Related U.S. Application Data

(60) Provisional application No. 60/614,072, filed on Sep. 29, 2004.

(51) Int. Cl.
*G08B 13/14* (2006.01)
(52) U.S. Cl. ............... 340/572.8; 340/572.1; 340/10.1; 53/507
(58) Field of Classification Search ... 340/572.1–572.8, 340/568.1, 573.1; 235/375, 385
See application file for complete search history.

(56) References Cited

U.S. PATENT DOCUMENTS

| | | | | |
|---|---|---|---|---|
| 3,369,538 A | * | 2/1968 | Frey et al. ................ | 126/262 |
| 4,721,217 A | * | 1/1988 | Phillips et al. ............. | 215/230 |
| 4,813,564 A | * | 3/1989 | Cooper et al. .............. | 215/366 |
| 5,081,445 A | | 1/1992 | Gill et al. | |
| 5,139,163 A | * | 8/1992 | Diaz ....................... | 220/258.2 |
| 5,996,832 A | * | 12/1999 | Nieuwoudt ............... | 220/257.2 |
| 6,137,413 A | | 10/2000 | Ryan, Jr. | |
| 6,271,753 B1 | * | 8/2001 | Shukla .................... | 340/545.6 |
| 6,329,915 B1 | * | 12/2001 | Brady et al. ............. | 340/572.1 |
| 6,342,838 B1 | | 1/2002 | Kolton et al. | |
| 6,371,380 B1 | * | 4/2002 | Tanimura ................. | 235/492 |

(Continued)

FOREIGN PATENT DOCUMENTS

EP    1 083 519 A2    3/2001

(Continued)

OTHER PUBLICATIONS

International Search Report dated Feb. 27, 2006.

(Continued)

*Primary Examiner*—Eric M Blount
(74) *Attorney, Agent, or Firm*—Caesar, Rivise, Bernstein, Cohen & Pokotilow, Ltd.

(57) ABSTRACT

The present invention is directed towards a novel procedure and system for making a security tag for an aluminum-pressed, cardboard container. The method employs a system of distancing the tag from the container and a method of calibrating the tag. The tag is then inserted into a specially designed cap and spaced a given distance from the container. The product is sealed and then sold to the consumer.

29 Claims, 6 Drawing Sheets

U.S. PATENT DOCUMENTS

| | | | |
|---|---|---|---|
| 6,486,783 B1 * | 11/2002 | Hausladen et al. | 340/572.8 |
| 6,696,955 B2 | 2/2004 | Kolton et al. | |
| 7,126,479 B2 * | 10/2006 | Claessens et al. | 340/572.1 |
| 7,158,033 B2 * | 1/2007 | Forster | 340/572.1 |
| 7,336,243 B2 * | 2/2008 | Jo et al. | 343/895 |
| 2003/0089513 A1 | 5/2003 | Nolte | |
| 2003/0235027 A1 | 12/2003 | Smeyak et al. | |
| 2004/0050724 A1 * | 3/2004 | Grul et al. | 206/217 |
| 2004/0074974 A1 * | 4/2004 | Senba et al. | 235/492 |
| 2005/0093700 A1 * | 5/2005 | Carrender | 340/572.8 |

FOREIGN PATENT DOCUMENTS

WO    WO 97/15035    4/1997

OTHER PUBLICATIONS

International Search Report for PCT/US2005/035140 dated May 22, 2006.

* cited by examiner

METHOD AND SYSTEM FOR TRACKING CONTAINERS HAVING METALLIC PORTIONS, COVERS FOR CONTAINERS HAVING METALLIC PORTIONS, TAGS FOR USE WITH CONTAINER HAVING METALLIC PORTIONS AND METHODS OF CALIBRATING SUCH TAGS

CROSS-REFERENCE TO RELATED APPLICATIONS

This application claims priority from provisional U.S. Patent Application No. 60/614,072, filed on Sep. 29, 2004 whose disclosure is incorporated by reference herein.

STATEMENT REGARDING FEDERALLY SPONSORED RESEARCH OR DEVELOPMENT

"Not Applicable"

INCORPORATION-BY-REFERENCE OF MATERIAL SUBMITTED ON A COMPACT DISK

"Not Applicable"

BACKGROUND OF THE INVENTION

1. Field of the Invention

This invention relates generally to security systems and devices for use with containers having some metallic portion to hold a security tag, e.g., an EAS tag, an RFID tag, etc., and more particularly, to devices for holding such a tag on the container such that an RF receiver is able to readily discern a return signal from the tag, to systems making use of such devices, and to methods of using such systems and calibrating such tags.

2. Description of Related Art

The prior art teaches various mechanisms of using security tags to secure a multitude of different products. Some examples of commonly known security tags are RF, AM and UHF tag, traditionally known as electronic article surveillance (EAS) tags. Other security tags, e.g., radio frequency identification (RFID) tags, make use of electronic chips. EAS, RFID and other types of electronic security tags can be and are used mounted or secured to many different products, e.g., books, pallets, containers, and electronics. Heretofore, products that are housed in containers or cans having metallic portions, e.g., containers or cans for baby foods and other foodstuffs, etc., have not been effectively tagged.

As will be appreciated by those skilled in the art, many containers for foods are made of plastic. However, plastic has inherent limitations for housing such products. For example, plastic may allow trace amounts of bacteria through it. Baby food manufacturers are particularly sensitive to the limitations of plastics as a container medium and consequentially, many such manufacturers make their containers or cans out of cardboard tubular midsection having a pressed, thin aluminum foil around the outside of the midsection as a means for preventing liquid leakage out of the container. Additionally, the lid and the base of the can or container are generally made of a thin aluminum sheet. A relatively thick, annular aluminum annular ring serves to join the lid to the cardboard midsection, a similar ring serves to join the base to the cardboard midsection. This arrangement provides an inexpensive, easily manufactured, waterproof container that can safely hold foodstuffs. However, such containers include so much metal that they cannot be effectively tagged with an EAS, RFID or other electromagnetic radiation based tag, since the metal of the container will interfere with the electromagnetic properties of the tag, e.g., the metal portion of the can will reduce the amplitude of the return signal from the tag. Moreover, the metallic portion of the container also tends acts as an antenna, thereby altering the frequency response of the tag.

Thus, a need exists for a device which will enable the effective tagging of containers that include substantial metallic portions, e.g., baby food containers, soup containers, etc.

BRIEF SUMMARY OF THE INVENTION

In accordance with one aspect of this invention there is provided a device for attachment to a container having a metallic portion onto which a security tag, e.g., an EAS tag, an RFID tag, etc., is desired to be secured. The tag is capable of receiving a transmitted electromagnetic signal over the air from a transmitter, e.g., a transceiver, and for returning a desired discernable electromagnetic signal to a receiver, e.g., the transceiver. The device has a holding portion and is arranged to be secured to the container, whereupon the holding portion is located over or under the metallic portion of the container. The holding portion of the device is arranged to hold the tag in place over or under, but spaced from, the metallic portion of the container by a distance sufficient to ensure that the metallic portion of the container does not preclude proper operation of the tag with the receiver.

In accordance with another aspect of this invention there is provided a security device for attachment to a container. The security device comprising a security tag, e.g., an EAS tag, an RFID tag, etc., and a tag holder for mounting the tag on the container. The container has a metallic portion onto which the security tag is desired to be secured, said security tag being capable of receiving a transmitted electromagnetic signal over the air from a transmitter, e.g., transceiver, and for returning a desired discernable electromagnetic signal to a receiver, e.g., the transceiver. The tag holder includes a holding portion for holding the tag thereon. The tag holder is arranged to be secured to the container over the metallic portion of the container so that the holding portion holds the tag in place over, but spaced from, the metallic portion of the container by a distance sufficient to ensure that the metallic portion of the container does not preclude proper operation of the tag with the receiver.

In accordance with still another aspect of this invention there is provided the combination of a conventional container, e.g., a baby food container, a security tag, e.g., an EAS tag, an RFID tag, etc., and a tag holder. The container has a metallic portion onto which the security tag is desired to be secured. The security tag is capable of receiving a transmitted electromagnetic signal over the air from a transmitter, e.g., a transceiver, and for returning a desired discernable electromagnetic signal to a receiver, e.g., the transceiver. The tag holder includes a holding portion on which the tag is secured. The tag holder is arranged to be secured to the container so that the holding portion holds the tag in place over or under, but spaced from, the metallic portion of the container by a distance sufficient to ensure that the metallic portion of the container does not preclude proper operation of said tag with the receiver.

In accordance with still another aspect of this invention there is provided a system for monitoring the presence of a container having a metallic portion. The system comprises a security tag, e.g., an EAS tag, an RFID tag, etc., a tag holder and a transmitter and a receiver, e.g., a transceiver. The tag is capable of receiving a transmitted electromagnetic signal over the air from the transmitter and for returning a desired discernable electromagnetic signal to the receiver. The tag holder includes a holding portion and is adapted to be secured to the container so that the holding portion holds the security tag on the container over or under, but spaced from, the metallic portion of the container by a distance sufficient to ensure that the metallic portion of the container does not interfere with the proper operation of the tag with the receiver.

In accordance with still another aspect of this invention there is provided a method of tagging a container having a metallic portion with a security tag, e.g., an EAS tag, an RFID tag, etc. The method basically entails providing a security tag capable of receiving a transmitted electromagnetic signal over the air from a transmitter and returning a desired discernable electromagnetic signal to a receiver. The tag is disposed and secured to the container over or under, but spaced from, the metallic portion of the container by a distance sufficient to ensure that the metallic portion of the container does not preclude proper operation of the tag with the receiver.

In accordance with still another aspect of this invention there is provided a method of calibrating a security tag, e.g., an EAS tag, a RFID tag, etc., that is arranged for use with a container having a metallic portion. The method entails providing a security tag capable of receiving a transmitted electromagnetic signal over the air from a transmitter and for returning a discernable electromagnetic signal to a receiver when operating in free space. The tag is disposed over or under, but spaced from, the metallic portion of said container. An electromagnetic signal is transmitted to the, whereupon said tag provides a discernable return signal as a function of its location with respect to the metallic portion of the container. The frequency and magnitude of the return sign is determined and, if necessary, at least one electrical parameter of the tag is modified, so that the return signal provided by the tag is within a desired frequency range, e.g., 13.56 MHz, 8.2 MHz+/−0.5 MHz, etc., and of a minimum amplitude.

BRIEF DESCRIPTION OF SEVERAL VIEWS OF THE DRAWINGS

The invention will be described in conjunction with the following drawings in which like reference numerals designate like elements and wherein.

DETAILED DESCRIPTION OF THE INVENTION

Figure 4A:
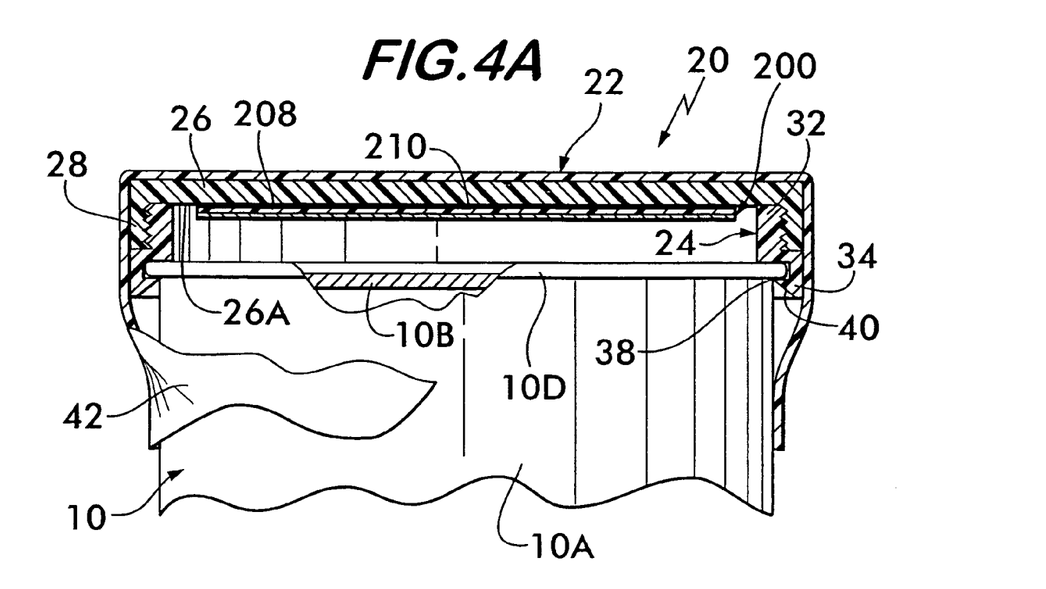
FIG. 4A is a side elevation view, partially in section, of one exemplary embodiment of a holding device constructed in accordance with one aspect of this invention shown holding a tag like that of FIG. 3 on the top portion of the container of FIG. 1.

Referring now in greater detail to the figures, there is shown in FIG. 4A one exemplary embodiment of a holding device 20 constructed in accordance with one aspect of this invention for holding a security, e.g., RF, RFID, etc., tag 200 (FIG. 3) on a conventional container or can 10 having at least one metallic portion. The device 20 of FIG. 4A, as well as the other exemplary embodiments of other holding devices shown and described herein and other holding devices constructed in accordance with the teachings of this invention, enables a security tag to be mounted on the container adjacent the metallic portion of the container to operate, e.g., respond to an interrogation signal, in a manner similar to a tag on a non-metallic container. Accordingly, a metallic container making use of this invention can be protected from theft, tracked and/or identified as has been accomplished with tags on non-metallic containers.

Figures 1, 2, 3:
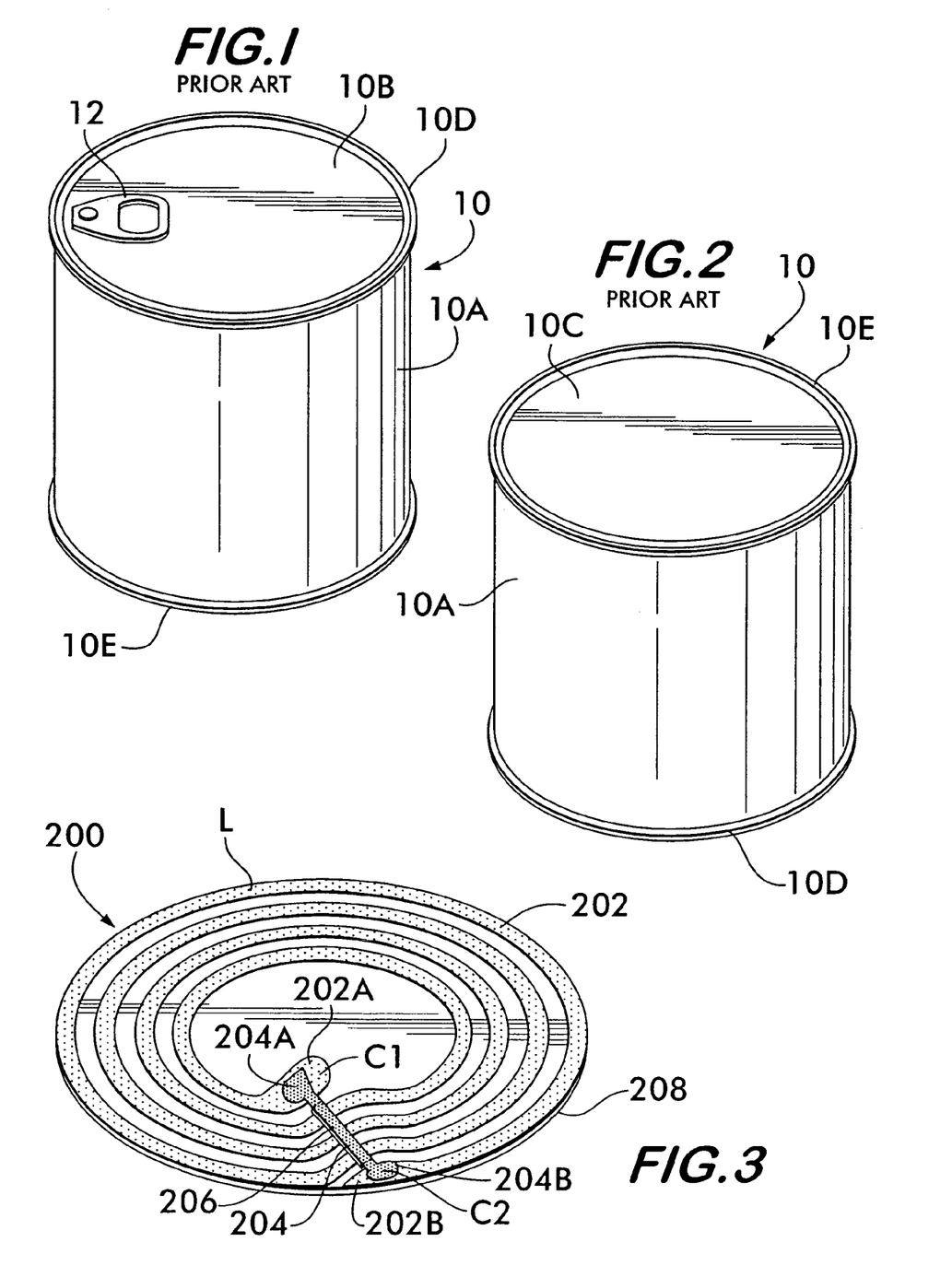
FIG. 1 is an isometric view of one exemplary, prior art, type of container for which the subject invention is of particular utility.
FIG. 2 is a view, like that of FIG. 1, but showing the bottom of the prior art container of FIG. 1.
FIG. 3 is an isometric view of one exemplary EAS tag constructed in accordance with one aspect of this invention and which is arranged for securement to either the top or the bottom of the container shown in FIGS. 1 and 2.

It should be pointed out at this juncture that the container or can 10 can be of any type of construction, such as a conventional can shown in FIGS. 1 and 2, or any other type of hollow container having at least one wall portion formed of metal. Depending upon the size of the container and the amount of metal that makes it up, the tag can be of conventional construction, e.g., a conventionally constructed EAS tag, or can be a larger area, e.g., circular shaped, tag, constructed in accordance with another aspect of this invention. One such tag is the exemplary tag 200 shown in FIG. 3.

Before describing the details of the various holding devices of this invention, a brief description of the can 10 and of the tag 200 is in order. To that end, as can be seen in FIGS. 1 and 2 the container or can 10 basically comprises cylindrical mid-section or side wall 10A, a top wall 10B, a bottom wall 10C (FIG. 2), a top bead 10D extending about the periphery of the side wall 10A at the interface of the side wall and the top wall and a bottom bead 10E extending about the periphery of the side wall at the interface of the side wall and the bottom wall. The side wall is a tubular member that may be formed of cardboard with a metallic, e.g., aluminum, inner lining (not shown) or may be made up entirely of metal, e.g., aluminum. The top wall or lid 10B is a generally planar member of circular profile and can be made up of any suitable material, e.g., aluminum. The bottom wall or base 10C is of similar construction to the top wall 10B, except that the top wall may be constructed, e.g., have a weaken or frangible line 10F extending about its periphery, to be readily removed by pulling if off of the container to provide access to the contents of the container. To that end, the top wall or lid 10B may include a conventional pull tab 12. The beads 10D and 10E are of identical construction, e.g., each is formed of aluminum. The bead 10D serves to fixedly secure the lid 10B to the side wall 10A. Similarly, the bead 10E serves to fixedly secure the base 10C to the side wall 10A. It should be pointed out at this juncture that the metal portions of the container 10 can be formed of other metals than aluminum, if desired.

The exemplary tag 200 of this invention, will be described later. Suffice for now to state that it is similar in construction to activatable/deactivatable swept frequency EAS tags sold by Checkpoint Systems, Inc., of Thorofare, N.J., the assignee of this invention, except that it is somewhat larger in size and of circular profile to enable it to cover most of the area of either the lid 10B or base 10C of the container 10 when it is mounted thereon by a mounting device constructed in accordance with this invention, e.g., a device like device 20 of FIG. 4A. In particular, in the exemplary embodiment shown in FIG. 3 the security tag 200 has the same basic structure as that disclosed in FIG. 2 of U.S. Pat. No. 5,081,445 (the "'445 patent"), which is assigned to Checkpoint Systems, Inc. and whose disclosure is incorporated by reference herein, with the following exceptions. The diameter of tag 200 is 3 inches to 4.5 inches, whereas the tag of the '445 patent has a surface area of about 2.5 sq. in. Moreover, the tag 200 is circular in shape, whereas the tag of '445 patent is square in shape. The circular shape of tag 200 has renders the tag more efficient per unit area than tags of square or rectangular profile. Thus, when the energy demands of the tag are high, and the space one can fit the tag into is small, a circular tag is preferable. Otherwise, a square or rectangular profile tag can be used in place of the circular tag. However, the surface area of the square or rectangular tag will need to be greater than the circular tag, for a given application. If the container is a different shape, e.g., the portion on which the tag is to be located, the largest circular tag that can be fitted into that shape is preferred.

As will be appreciated by those skilled in the art, by using the largest tag possible, one can reduce the effects that the metallic portion of the container has on signal returned to the receiver. However, in experimentation, using a 11.4 sq. in. tag provides useful signal power, though larger tags would be more powerful, but more expensive to manufacture. Additionally, the inductance and capacitance of circular tags are different as compared to square tags.

Turning now to FIG. 3 the details of the exemplary tag 200 will now be considered. As can be seen, tag 200 basically comprises a pair of electrically conductive patterns or traces, to be described hereinafter, to form the electrical circuitry of the tag. In the exemplary embodiment of FIG. 3, the tag 200 is an EAS resonant tag in the form of a coil L and a pair of capacitors C1 and C2, with the electrically conductive traces making up those electrical components. In particular, the tag 200 includes a first electrically conductive trace 202 and a second electrically conductive trace 204. The traces are formed of any suitable electrically conductive material, e.g., aluminum. The first electrically conductive trace 202 is in the form of a spiral coil that is of constant width along its length except for its end portions 202A and 202B. The coil forms the inductor L. The end portion 202A at the inner end of the coil 202 is of an enlarged, e.g., bulbous, area to form a first plate of a first capacitor, namely, capacitor C1. The end portion 202B at the outer end of the coil 202 is also enlarged to form a first plate of a second capacitor, namely, capacitor C2. The second trace 204 is disposed over the first trace and is an elongated, generally linear, strip that is of constant width along its length except for its end portions 204A and 204B. The end portion 204A at the inner end of the strip 204 is of an enlarged, e.g., bulbous, area to form the second plate of the first capacitor C1. The end portion 204B at the outer end of the strip 204 is also of an enlarged area to form the second plate of the second capacitor C2. A dielectric layer 206, such as a film of polyethylene, only a portion of which is shown, is interposed between the two electrically conductive traces 202 and 204. The dielectric layer 206 serves as the dielectric between the plates of the first and second capacitors C1 and C2, respectively.

As will be appreciated by those skilled in the art, the electrical properties of the resonant circuit created by the traces 202 and 204 can be adjusted by changing the geometry and/or the materials making up the traces and/or by changing the thickness and/or material(s) making up the dielectric film 206. The adjustment of the electrical properties of the tag is important to enable the tag to be appropriately calibrated for use with a particular container construction and holding device constructions, as will be described in detail later.

The tag 200 may be mounted on a paper layer or some other substrate, such as substrate 208, to facilitate its securement to a holding device constructed in accordance with this invention, or to the article to be tagged (if no holding device is necessary, e.g., if the container doesn't include any metallic portion over which the tag is to be placed). In order to facilitate the securement of the tag to the holding device or to the article itself the substrate 206 may include an adhesive (not shown) on it.

The tag 20 when mounted on the container 10 by means of a mounting device constructed in accordance with this invention is particularly suitable for use in a conventional EAS security system. For example conventional EAS equipment, e.g., an RF pedestal including a transceiver, can be used to generate a so-called swept RF signal within a desired bandwidth. The inductor/capacitor circuit of the tag 200 is resonant within that transmitted frequency band, e.g., at appoximately 8.2 MHz+/−0.5 MHz. The presence of a non-deactivated tag within the field of that transmitted RF signal distorts the signal and that distortion is detected by the receiver portion of the transceiver, which then produces an alarm. If however, the tag has been deactivated, an alarm signal will not be produced when the tag is within the field.

Turning now again to FIGS. 4A and 4B, the details of the construction and operation of one exemplary embodiment of a tag holding device 20 constructed in accordance with this invention will now be discussed. To that end it can be seen that the holding device 20 basically comprises a cap which is arranged to be secured to the container 10 over its lid or top wall 10B. This is merely exemplary, since the cap could just as easily be secured over the base or bottom wall 10C.

Figure 4B:
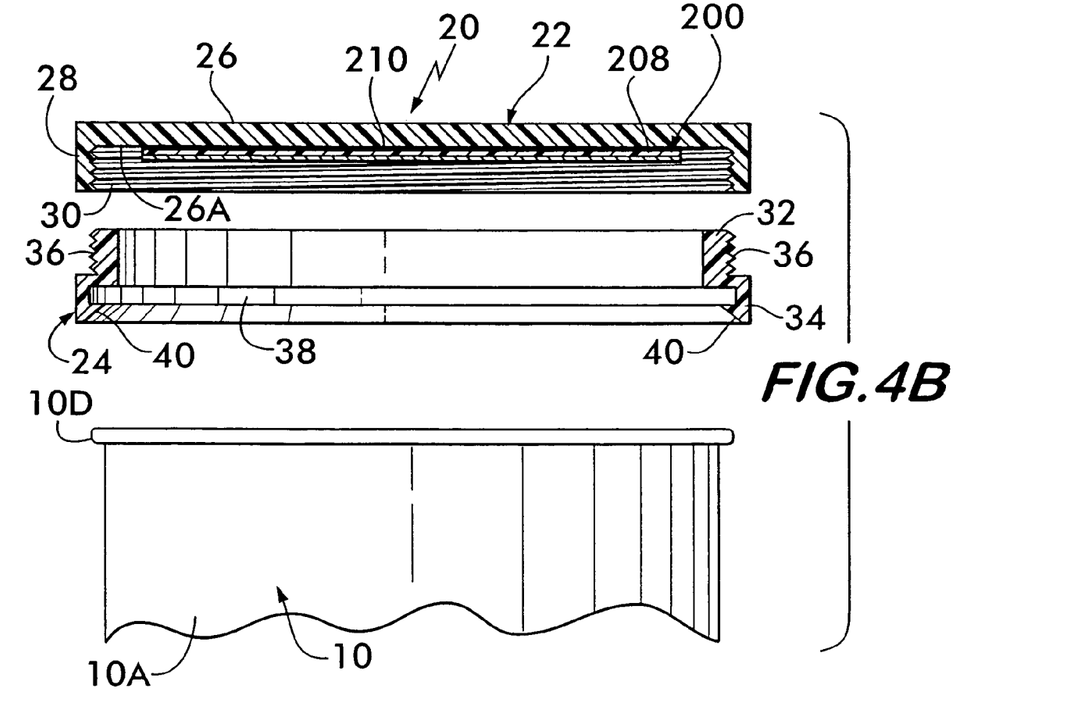
FIG. 4B is an exploded view, partially in section, of the embodiment of the holding device shown in FIG. 4A.

The cap basically comprises a disk-like member 22 and an ring-like insert 24, each of which is preferably made of plastic or some other non-metal. The member 22 is in the form of a generally planar wall 26 of circular profile having a downwardly depending annular flange 28. The inner surface of the flange 28 includes an internal helical thread 30. The insert 24 is in the form of a ring having an upper annular portion 32 and a lower annular portion 34 The upper annular portion 32 has an outside diameter that is approximately equal to the inside diameter of the annular flange 28 and includes an external helical thread 36 for engagement with the internal helical thread 30. The engagement of the threads 30 and 36 releasably secures the disk-like member 22 to the ring-like insert 24. The lower annular portion 34 depends downward from the upper portion 32 and is of larger outside diameter than the outside diameter of the upper portion 32. The inner surface of the lower annular portion 34 includes an annular recess 38 whose inside diameter is just slightly larger than the outside diameter of the upper or lower beads 10D and 10E, respectively, of the can 10. The recess 38 is provided to enable the upper or lower bead of the can to be snap-fit therein to mount the assembled cap 22 on the can 10. In order to facilitate that action, the bottom end of the lower annular portion 34 of the ring-like insert includes a projection or lip having a cam surface 40 extending inward radially. This projection is arranged to flex slightly to enable the bead of the can to slide over the cam surface 40 and into the contiguous recess 38, thereby releasably locking the holding device (cap) 20 in place on the can.

When so mounted the undersurface 26A of the holding device 20 will be spaced from the metallic lid of the can 10. The undersurface 26A thus can serve as the location for mounting the security tag, e.g., tag 200, to space the tag from the metal of the lid 10B (or the base 10C, if the cap 20 is mounted over the base). By spacing the tag 200 away from the metal of the lid, the signal compromising effect of that metal is overcome. In particular, the spacing of the tag from the metal lid overcomes the signal amplitude attenuating effect of the metal of the lid. The amount of spacing between the tag and the metal lid or base can be determined empirically or otherwise to enable the tag when mounted on the can to provide a discernable return signal of a desired amplitude and within a desired frequency range to be readily read by the receiver of the security system. The manner of calibrating the tag for such operation will be described later.

The tag 20 can be held onto the undersurface 26A of the holding device or cap 20 in various manners. In the embodiment shown in FIGS. 4A and 4B an adhesive is used. That adhesive may be in the form of a coating 210 on the substrate 208 of the tag 200.

Since the holding device (cap) 20 is snap-fit on the container 10, it may be readily removed by the user (purchaser) of the product to provide the user with access to the lid (or base, as the case may be) of the container. In particular, all that is required to provide such access is for the user to pull the cap 20 upward with respect to the can 10, whereupon the bead 10D will exit from the annular recess 38, thereby freeing the cap from the can. The user can then open the can's lid 10B by merely pulling on the pull tab 12.

In order to deter the surreptitious removal of the holding device or cap 20 with the tag 200 therein from the container 10 while it is in the retail establishment and before it passes through the exit security system, a seal or wrap can be provided about the holding device and the container to hold the two together. To that end, as shown in FIG. 4A a wrap 42, in the form of a heat shrinkable band, may be provided about the entire holding device/can combination or only about the holding device and a contiguous portion of the can. Moreover, the wrap need not be heat shrinkable. Other mechanisms for sealing the cap 20 onto the container are envisioned, such as using an adhesive seal, a paper seal, or using a cap integrally formed on the container. The last option is similar to the way milk containers are sealed.

Figure 7A:
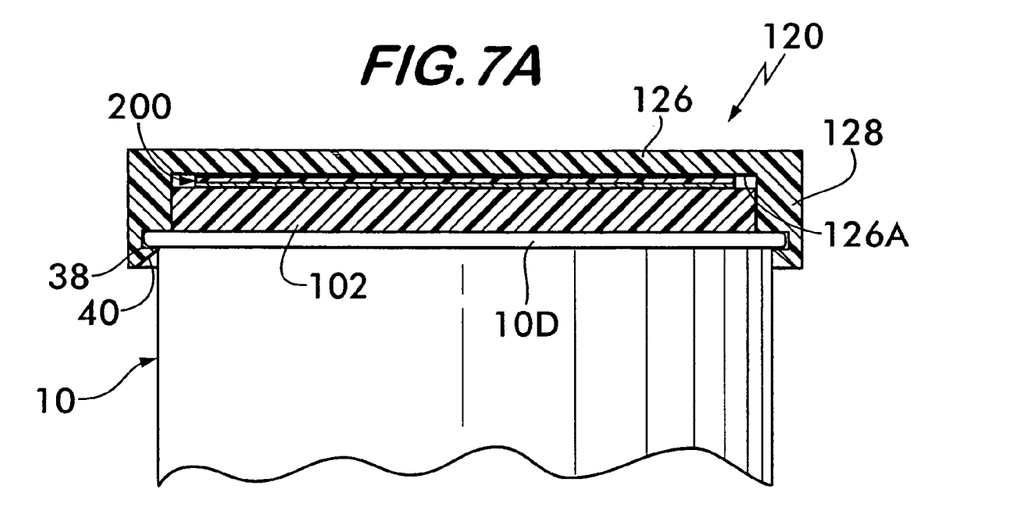
FIG. 7A is a side elevation view, partially in section, of still another exemplary embodiment of a holding device constructed in accordance with one aspect of this invention shown holding a tag like that of FIG. 3 on the top portion of the container of FIG. 1.
Figure 7B:
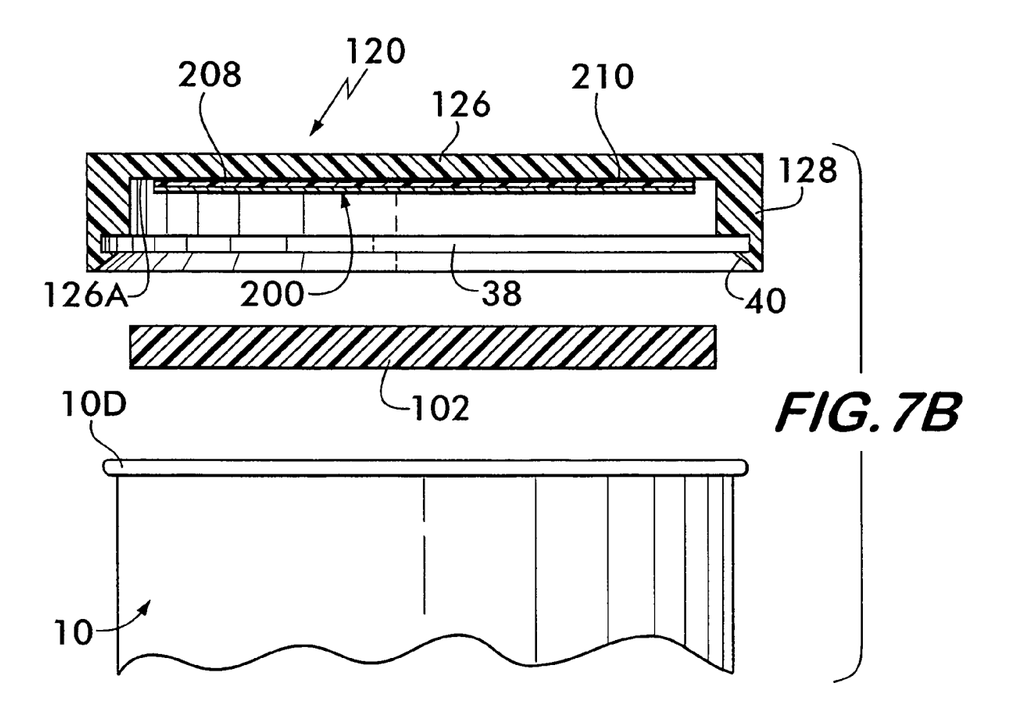
FIG. 7B is an exploded view, partially in section, of the embodiment of the holding device shown in FIG. 7A.

In FIGS. 7A and 7B there is shown an alternative embodiment of a holding device or cap 120 constructed in accordance with this invention. The cap 120 is similar in most respects to the holding device 20, except that it is a unitary structure that is not made up of a disk-like member and ring-like insert. Moreover, the holding device 120 makes use of a spacer, to be described later, that is located between the metal portion of the can 10 and the portion of the holding device 120 at which the security tag 200 is located. In the interest of brevity the common components of the holding devices 20 and 120 will be given the same reference numbers. Thus, as can be seen the holding device 120 basically comprises a integral member, preferably formed of plastic or some other suitable non-metal, and having a generally planar wall 126 of circular profile and a downwardly depending annular flange 128. The inner surface of the annular flange 128 includes an annular recess 38 whose inside diameter is just slightly larger than the outside diameter of the upper or lower beads 10D and 10E, respectively, of the can 10. The recess 38 is provided to enable the upper or lower bead of the can to be snap-fit therein to mount the assembled cap 120 on the can 10. In order to facilitate that action, the bottom end of the lower annular portion 34 of the ring-like insert includes a projection having a cam surface 40 extending inward radially. This projection is arranged to flex slightly to enable the bead of the can to slide over its outer surface and into the contiguous recess, thereby releasably locking the holding device 120 in place on the can 10.

The planar wall 126 includes an undersurface 126A, which like the embodiment 20 serves as the location for mounting the security tag 200, whereupon the tag of the holding device will be spaced from the metallic lid of the can 10. Unlike the holding device, where air serves to fill the space between the tag and the metal portion of the can, a physical spacer element 102 is provided in the holding device 120 to sandwich the tag 200 between it and the undersurface 126A of the cap 120. The spacer 102 basically comprises a disk-like member formed of plastic or some other suitable non-metal. The outside diameter of the spacer is approximately equal to the inside diameter of the annular flange 128, and the thickness of the spacer is such that its lower surface is flush with the upper edge of the annular recess 28 when the tag is sandwiched therebetween, as clearly shown in FIG. 7A. The tag 200 can be held in place by an adhesive layer 210 as described earlier. Since the tag will be sandwiched between the spacer 102 and the undersurface 126 of the cap member the adhesive 210 may be omitted.

If desired, the holding device 120 may make use of a wrap 42 to hold it in place on the container to deter its removal from the container.

Figure 5A:
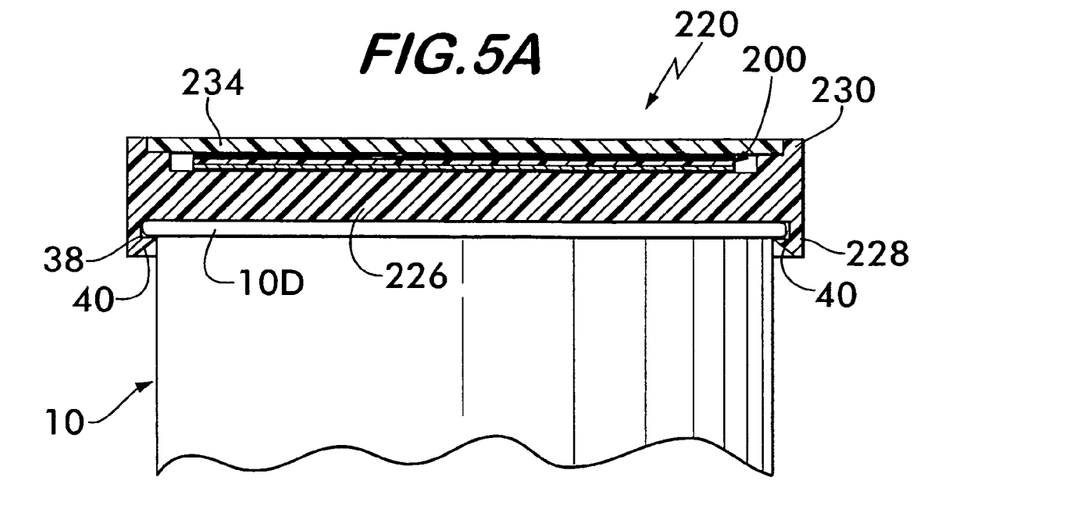
FIG. 5A is a side elevation view, partially in section, of another exemplary embodiment of a holding device constructed in accordance with one aspect of this invention shown holding a tag like that of FIG. 3 on the top portion of the container of FIG. 1.
Figure 5B:
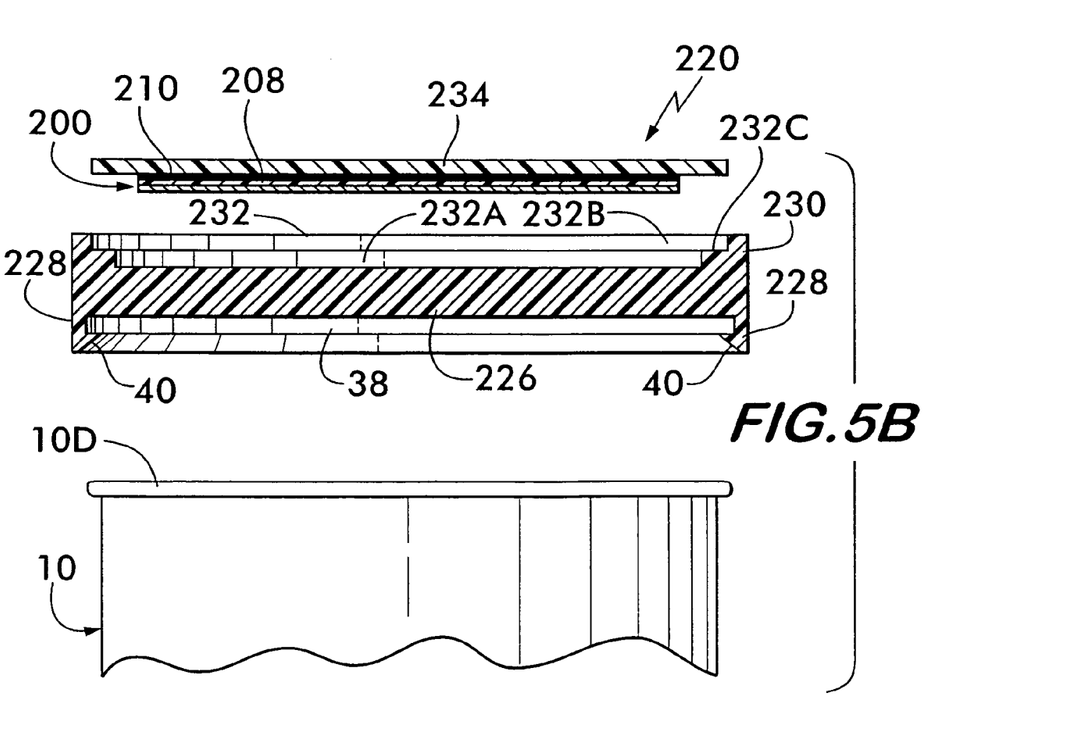
FIG. 5B is an exploded view, partially in section, of the embodiment of the holding device shown in FIG. 5A.

In FIGS. 5A and 5B there is shown another exemplary embodiment of a holding device 220 of this invention. The holding device 220 is perhaps the most preferred of the various embodiments since it is constructed to have a portion serving as a label for the container 10 to which the device 220 is secured. The device 220 includes various features common to the holding devices 20 and 120. In the interest of brevity the common components of those devices will be given the same reference numbers. As can be seen the holding device or cap 220 basically comprises an integral member, preferably formed of plastic or some other suitable non-metal, and having a generally planar central wall 226 of circular profile, a downwardly depending annular flange 228 and an upwardly depending annular flange 230. The inner surface of the downwardly depending annular flange 128 includes an annular recess 38 whose inside diameter is just slightly larger than the outside diameter of the upper or lower beads 10D and 10E, respectively, of the can 10. The recess 38 is provided to enable the upper or lower bead of the can to be snap-fit therein to mount the assembled cap 220 on the can 10. In order to facilitate that action, the bottom end of the lower annular portion 34 of the ring-like insert includes a projection having a cam surface 40 extending inward radially. This projection is arranged to flex slightly to enable the bead of the can to slide over its outer surface and into the contiguous recess, thereby releasably locking the holding device 220 in place on the can 10.

The planar wall 226 includes a stepped circular shaped recess 232 in its top surface. The recess 232 includes a lower section 232A and an upper section 232B, The inside diameter of the upper section is larger than the inside diameter of the lower section to form an annular ledge 232C. This surface serves to receive an annular disk-like member 234, which can be used to form a label for the device/article to be tagged. The label 234 basically comprises a sheet of plastic, cardboard, paper or some other material which can bear indicia, e.g, text, graphics, etc., thereon. The outside diameter of the label 234 is slightly less than the inside diameter of the recess section 232A so that its peripheral edge can rest on and be secured by means, e.g., an adhesive (not shown) to the top surface of the ledge 232C. The undersurface of the label 234 serves as the location on which the tag 200 is mounted. To that end, the tag is secured to the undersurface of the label 234 by the adhesive 210. The height of the recess section 232B is selected to be at least equal to the thickness of the label 232. Moreover, the height of the recess section 232A is selected to be at least equal to the combined thickness of the tag 200 and the adhesive layer 210. Accordingly, when the tag is secured onto the undersurface of the label 234 and the label is secured in the recess 232 of the cap member 220 the label fits flush within the cap as shown in FIG. 5A, with the thickness of the planar wall 226 spacing the tag from the metal lid 10B of the container. The adhesive securement of the label to the cap device 220 prevents the surreptitious removal of the tag.

If desired the holding device 220 may make use of a wrap 42 to hold the device in place on the container to deter removal of the device.

Figure 6A:
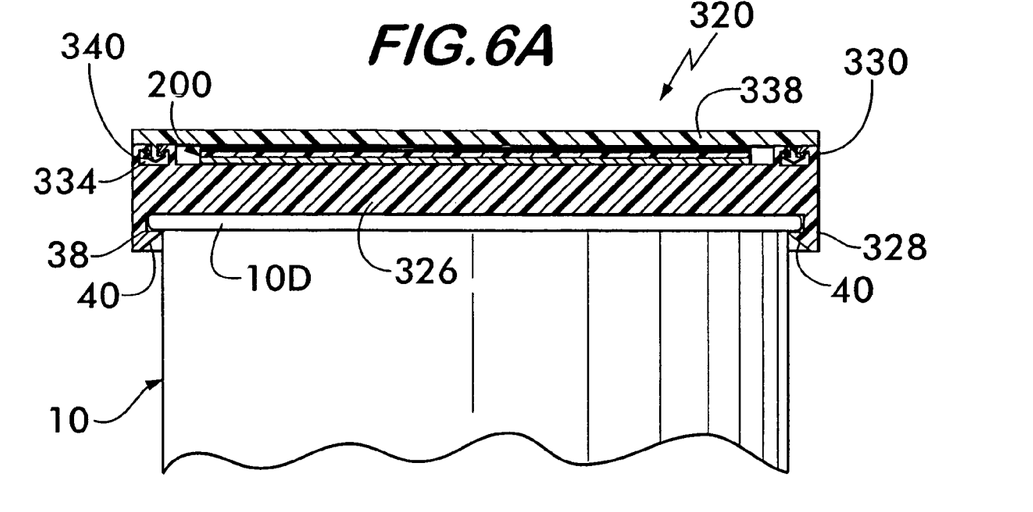
FIG. 6A is a side elevation view, partially in section, of still another exemplary embodiment of a holding device constructed in accordance with one aspect of this invention shown holding a tag like that of FIG. 3 on the top portion of the container of FIG. 1.
Figure 6B:
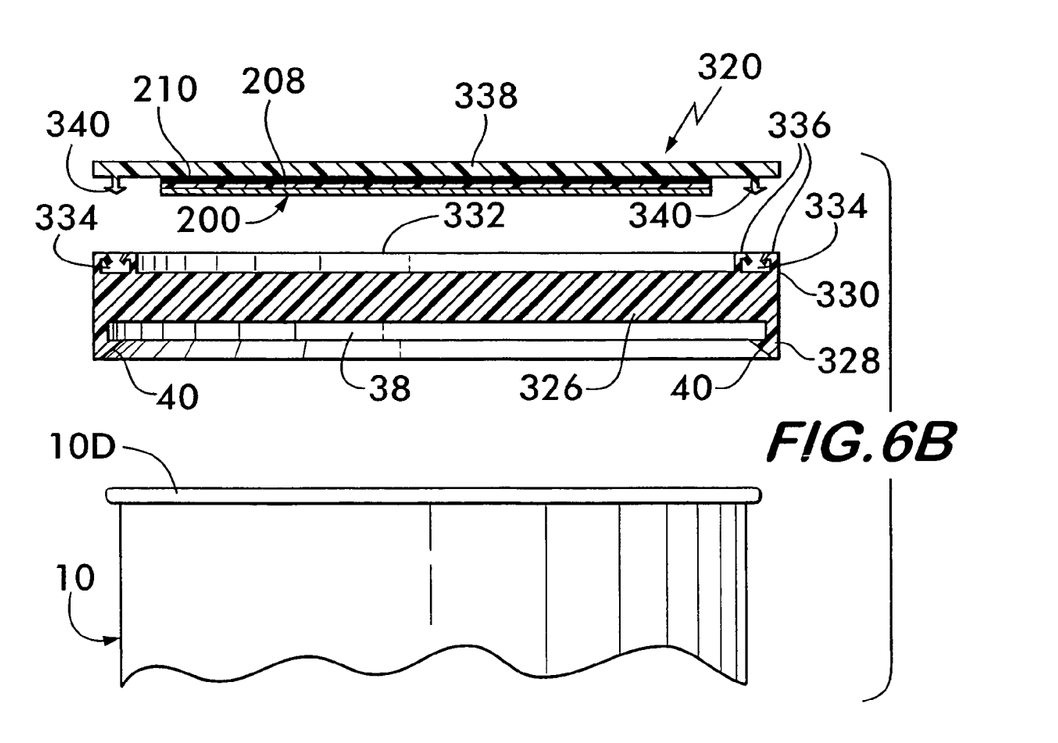
FIG. 6B is an exploded view, partially in section, of the embodiment of the holding device shown in FIG. 6A.

In FIGS. 6A and 6B there is shown another exemplary embodiment of a holding device or cap 320 constructed in accordance with this invention. The holding device 320 is similar in many respects to the holding device 220 in that it makes use of a label to serve as the means for holding the tag in place. Thus, in the interest of brevity the common components of the holding devices 220 and 320 will be give the same reference numbers. The holding device 320 basically comprises an integral member, preferably formed of plastic or some other suitable non-metal, and having a generally planar central wall 326 of circular profile, a downwardly depending annular flange 328 and an upwardly depending annular flange 330. The inner surface of the downwardly depending annular flange 128 includes an annular recess 38 whose inside diameter is just slightly larger than the outside diameter of the upper or lower beads 10D and 10E, respectively, of the can 10. The recess 38 is provided to enable the upper or lower bead of the can to be snap-fit therein to mount the assembled cap 320 on the can 10. In order to facilitate that action, the bottom end of the lower annular portion 328 includes a projection having a cam surface 40 extending inward radially. This projection is arranged to flex slightly to enable the bead of the can to slide over its outer surface and into the contiguous recess, thereby releasably locking the holding device 220 in place on the can 10.

The upper annular flange 330 includes a top surface 332 in which an annular recess 334 is located. A pair of opposed annular lips 336 extend towards each other on opposite sides of the recess 334 contiguous with the top surface 332. The lips 336 are angled slightly downward to create a tapering entryway to the recess 334. This entryway and recess serves as the means for securing a label to the cap device 320, as will be described hereinafter.

The label basically comprises a disk-like member 338 of circular profile and which can bear indicia, e.g, text, graphics, etc., thereon. The undersurface of the label serves as the location for mounting the security tag 200 in the same manner as described earlier, e.g., via the use of the adhesive 210. As also mentioned above the label is arranged to be secured to the cap device 320 via the recess 334. To that end, an annular ridge 340 projects downward from the undersurface of the label member 338 closely adjacent the periphery thereof. The ridge in cross-section resembles an arrowhead. Accordingly, when the label 338 with the tag secured to its bottom surface as described above is placed over the cap device 320 it can be pressed downward to secure it to the cap device. In particular, the downward push causes the arrowhead portion of the label's ridge 338 to pass through the tapering entryway to the recess 334, thereby causing the lips 336 to flex to enable the arrowhead portion of the ridge to pass therethrough into the recess. Once this has occurred the lips flex back to lock the arrowhead portion of the ridge within the recess. This action effectively secures the label 338 onto the cap device 320, thereby preventing surreptitious removal of the tag 200.

If desired the holding device 320 may make use of a wrap 42 to hold the device in place on the container to deter removal of the device.

Figure 8:
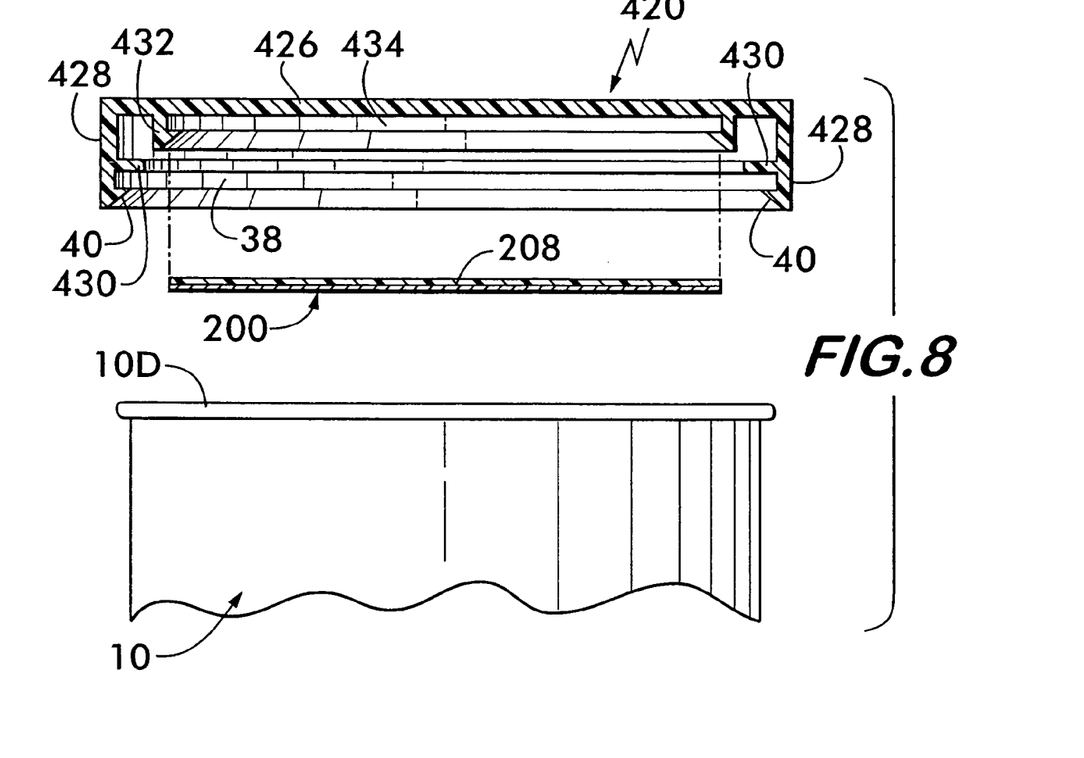
FIG. 8 is an exploded side elevation view, of still another exemplary embodiment of a holding device constructed in accordance with one aspect of this invention shown holding a tag like that of FIG. 3 and which is adapted to be mounted on the top portion of the container of FIG. 1.

In FIG. 8 there is shown another exemplary embodiment of a holding device 420 constructed in accordance with this invention. The holding device 420 is similar in many respects to the holding device 120 in that it makes use of a unitary construction, but does not include a spacer element and includes alternative means for securing the tag 200 in place. Thus, in the interest of brevity the common components of the holding devices 120 and 420 will be give the same reference numbers. The holding device or cap 420 basically comprises an integral member, preferably formed of plastic or some other suitable non-metal, and having a generally planar central wall 426 of circular profile, a downwardly depending annular flange 428, and an intermediate annular flange 430. The intermediate flange extends radially inward from the inner surface of the downwardly depending annular flange 428. The inner surface of the downwardly depending annular flange 428 includes an annular recess 38 located immediately below the intermediate flange 430. The annular recess 28 has an inside diameter just slightly larger than the outside diameter of the upper or lower beads 10D and 10E, respectively, of the container 10 to enable it to receive either the top or bottom beads of the container to secure the holding device 420 on the container in the same manner as described earlier.

The tag 200 is arranged to be secured to the undersurface of the generally planar central wall 426 without the use of any adhesive. To that end an annular wall or ridge 432 projects downward from the undersurface of the central wall 426. An annular recess 434 is located in the ridge 432 to enable the circular tag 200 to be snap-fit therein. In order to facilitate that action, the bottom end of the annular ridge 432 includes a projection having a cam surface 40 extending inward radially. This projection is arranged to flex slightly to enable the periphery of the circular tag 200 to slide over its cam surface and into the contiguous recess 434, thereby locking the tag 200 in place in that recess under the central wall 426 of the cap 420.

When the tag is so mounted and the holding device or cap 420 is mounted on the container 10 the tag 200 will be spaced from the metallic lid of the can 10.

If desired the holding device 420 may make use of a wrap 42 to hold the device in place on the container to deter removal of the device.

Figure 9:
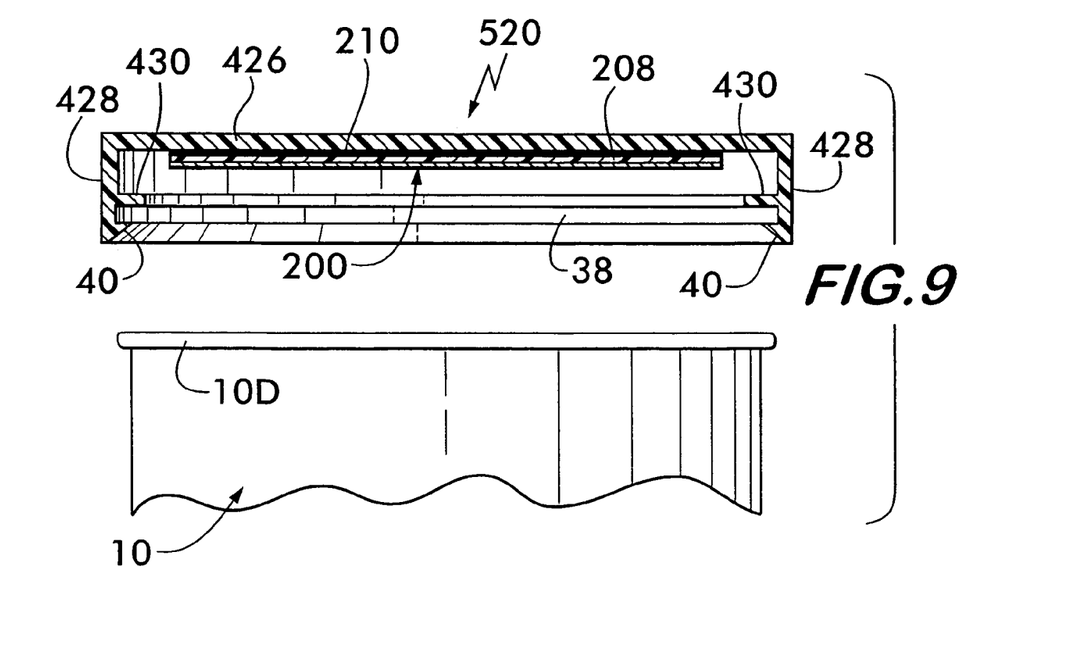
FIG. 9 is a side elevation view, partially in section, showing the embodiment of the holding device of FIG. 8 and the tag of FIG. 3 ready to be mounted on the top portion of the container of FIG. 1.

In FIG. 9 there is shown another exemplary embodiment of a holding device 520 constructed in accordance with this invention. The holding device 520 is similar in many respects to the holding device 420 except that it makes use of the adhesive securement of the tag to the device. Thus, in the interest of brevity the common components of the holding devices 420 and 520 will be given the same reference numbers. The holding device or cap 520 basically comprises an integral member, preferably formed of plastic or some other suitable non-metal, and having a generally planar central wall 426 of circular profile, a downwardly depending annular flange 428, and an intermediate annular flange 430. The intermediate flange extends radially inward from the inner surface of the downwardly depending annular flange 428. The inner surface of the downwardly depending annular flange 428 includes an annular recess 38 located immediately below the intermediate flange 430. The annular recess 28 has an inside diameter just slightly larger than the outside diameter of the upper or lower beads 10D and 10E, respectively, of the container 10 to enable it to receive either the top or bottom beads to secure the holding device 420 on the container in the same manner as described earlier.

As mentioned above, the tag 200 is arranged to be secured to the undersurface of the generally planar central wall 426 of the holding device 520 by use of an adhesive. To that end, the adhesive is preferably in the form of a coating 210 on the substrate 208 of the tag 200.

If desired the holding device 520 may make use of a wrap 42 to hold the device in place on the container to deter removal of the holding device.

It should be pointed out at this juncture that a holding device or cap of this invention may not include the annular recess for securing it to a container. Thus, it is contemplated that other securing mechanisms could be used, such as grooves, adhesives, fasteners, or other devices. Moreover, while some embodiments merely space the tag from the metal portion of the container by air, other embodiments make use of a physical spacer element, essentially sandwiching the tag between the top of the cap and the spacer element. The spacer, like the cap itself, is preferably made of plastic for economic & magnetic purposes as it is readily available and a dielectric. However, other materials may be substituted for plastic, as known in the art.

Calibration of the tag/holding device for use on a particular container is accomplished in the following general manner. In particular, the following utlines the general method steps for determining the necessary frequency that the tag needs to be designed at so that transceivers can receive the desired signal. For example, as is know, transceivers of EAS tags listen for a return signal at 8.2 MHz. Though the frequency of the tag will be different for each type of container, most of the tags have a return frequency set to 7.0 MHz. The inductance is 0.9:H and the capacitance is 521 pF. These ranges are exemplary and other values can be used to achieve the desired frequency. Also, other frequencies can be used such 13.56 MHz. All frequencies that are commonly received by receivers are envisioned as possible modifications to the tags return frequency. While other transceivers can easily be designed to receive drastically different frequencies, it is desirable to design this tag to work at this specific frequency so that it will be compatible with existing transceivers. While it is contemplated to have the transceiver emit a signal so that tag returns a signal at 8.2 MHz, or simply have the transceiver listen at a different frequency, it is desirable to enable the tag to be compatible with other tags and security systems.

Checkpoint Systems Inc, the assignee of the subject invention, commercially offers an EAS security tag under model designation of "410" EAS tag. That tag has the following basic properties.

Front area etched=0.5807 sq. in.
Back area etched=1.6814 sq. in.
Design Frequency=8.4 MHZ.
Final Frequency=8.2 MHz
Q Range=70-75
Capacitance 141.2 pf
Inductance=2.495 uh
Number of turns=8
Coil line width=0.034 in.
Spacing between coils=0.01 in.
Width of margins=0.1 in.
Circuit Dimensions=1.55 in.×1.65 in.

If the signal strength that the 410 tag returns in free air when exposed to a rf interrogation signal from an rf antenna of a conventional EAS pedestal, such as that sold by Checkpoint Systems, Inc., under the trademark Liberty PX, is said to establish a reference of 1.0 units, then the tag of the current invention returns a signal with a strength of 2.5-6.0 units. Higher strengths are envisioned as technological limitations allow. The signal strength needs to be greater, because the metallic container has a shielding effect on the return signal. Thus the tag's return signal is made stronger so the receiver can receive an intelligible signal from the tag.

Every canister, jar, can, or container has a different disruptive capacity on the magnet field generated by the tag. Generally, the container disturbs the frequency the tag resonates at, and reduces the magnitude of the signal. The container can be modified by varying the capacitance or inductance of the tag to raise or lower the signal at which the tag resonates. In order to minimize the detriment of the tag's signal loss resulting from the metal of the container, the tag is spaced away from the container. While the unique properties of the container will determine how far the tag will need to be spaced, the tag will generally be spaced at least 1 cm from the top of the container. The further away the container is, the greater the signal strength. Combining the two steps yields the distance the tag should be spaced and the limitations of the structure of the tag. This new tag is designed so that when it is placed onto a metallic container a standard transceiver for security tags can detect the signal.

The tag is structured to be able to return a signal when attached to a metallic container means that it is required that the signal is strong enough so that a standard pedestal-style transceiver, the standard distance away (4-6 feet), can detect the signal. An example of a standard transceiver is the Checkpoint Liberty PX pedestal.

As alluded to earlier, the finished product, i.e., the container with the holding device supporting a security tag thereon spaced from the container, is made by placing the tag into the cap, placing the spacer under the tag (if the holding device makes use of a spacer element), placing the cap on the container's lid, and optionally placing a safety seal or wrap over the cap and container. Alternatively, one could place the cap on the bottom of the container and place a standard cap on the top of the device. Or one could place a tagged cap on the top and bottom of the device.

As should be appreciated from the foregoing one aspect of the subject invention entails use of a special cap or tag holder that has a spacer inside of it which effectively brings the tag a given distance away from the metal top, lid, or cap of a container to be tagged. This drastically reduces the effect the metal structure of the container has on shielding the resonance signal of the tag. Without the spacer, the container blocks or at least substantially degrades the tag's return signal.

As should be appreciated by those skilled in the art from the above, the subject invention includes several aspects, e.g., a holding device that optionally has a spacer inside of it to allow a security tag to be spaced far enough away from a metallic portion of a container to provide an intelligible signal to be received by the receiver, a security tag that is powerful enough and is calibrated correctly to send a discernable signal back to the transceiver amidst the distortion and shielding caused by the metallic portion of the container, and a method of designing and calibrating security tags for appropriate operation on containers having at least one metallic portion using the holding devices of this invention. It should also be pointed out at this juncture, that while use of the tag shown in FIG. 3 is a preferred way to effectively tag a container having a metallic portion, conventionally constructed and shaped security tags may, in some cases, be used, depending upon the construction of the container/can and the size of the tag.

While the invention has been described in detail and with reference to specific examples thereof, it will be apparent to one skilled in the art that various changes and modifications can be made therein without departing from the spirit and scope thereof.

What is claimed is:

1. A method of calibrating a security tag that is arranged for use with a container having a metallic portion, said method comprising:
   (A) providing a security tag capable of receiving a transmitted electromagnetic signal over the air from a transmitter and for returning a discernable electromagnetic signal to a receiver when operating in free space;
   (B) securing said tag within a tag holder that conceals said tag from view when said tag holder is engaged with the container;
   (C) engaging said tag holder to the container so that said tag is disposed over or under, but spaced from, said metallic portion of said container;
   (D) transmitting an electromagnetic signal to said tag, whereupon said tag provides a discernable return signal as a function of its location with respect to said metallic portion of said container;
   (E) determining the frequency and magnitude of said return signal; and
   (F) modifying at least one electrical parameter of said tag so that said return signal provided by said tag is within a desired frequency range and of minimum amplitude.

2. The method of claim 1 additionally comprising the step of:
   (F) adjusting the spacing of said tag from the metallic portion of the container so that said return signal is of a minimum amplitude for said desired frequency range.

3. The method of claim 1 wherein said tag comprises an LC circuit.

4. The method of claim 3 wherein said step of modifying at least one electrical parameter of said tag comprises modifying at least one of the inductance and capacitance of said LC circuit.

5. The method of claim 1 wherein a frequency range of said transmitted electromagnetic signal is approximately 8.2 MHZ+/−0.5 MHZ.

6. The method of claim 1 wherein a frequency of said transmitted electromagnetic signal is approximately 13.56 MHZ.

7. The method of claim 1 wherein said step of disposing said tag over or under said metallic portion of said container is accomplished by means of a device arranged to be secured to said container.

8. A security device for attachment adjacent a circular metallic surface of a container, said security device comprising:
   a security tag that responds to a magnetic or an electromagnetic field of a particular frequency or frequencies; and
   a tag holder for mounting said security tag adjacent the circular metallic surface of the container, said tag holder comprising:
      a circular-shaped non-conductive member having an open upper recess section and a lower recess section;
      a circular-shaped non-conductive lid comprising a first side and a second side, said second side including said security tag secured thereto, said circular-shaped non-conductive lid being securable with said open upper recess section; and
   wherein said lower recess section receives the periphery of the circular metallic surface of the container.

9. The security device of claim 8 wherein said first side comprises indicia pertaining to the container.

10. The security device of claim 8 wherein said security tag is circular-shaped.

11. The security device of claim 10 wherein said security tag comprises a circular coil.

12. The security device of claim 11 wherein said security tag comprises a pair of capacitors coupled to each end of said coil.

13. A security device for attachment adjacent a circular metallic surface of a container, said security device comprising:
   a security tag that responds to a magnetic or an electromagnetic field of a particular frequency or frequencies; and
   a tag holder for mounting said security tag adjacent the circular metallic surface of the container, said tag holder comprising:
      a circular-shaped non-conductive member having an undersurface and a downwardly-depending flange contiguous with said undersurface defining a recess, said downwardly depending flange comprising a threaded inner wall, said security tag being secured to said undersurface;
      a circular-shaped non-conductive insert having a threaded outer wall for engaging said threads in said threaded inner wall, said circular-shaped non-conductive insert further comprising an annular portion; and
   wherein said annular portion receives the periphery of the circular metallic surface of the container.

14. The security device of claim 13 wherein said security tag is circular-shaped.

15. The security device of claim 14 wherein said security tag comprises a circular coil.

16. The security device of claim 15 wherein said security tag comprises a pair of capacitors coupled to each end of said coil.

17. A security device for attachment adjacent a circular metallic surface of a container, said security device comprising:
   a security tag that responds to a magnetic or an electromagnetic field of a particular frequency or frequencies; and
   a tag holder for mounting said security tag adjacent the circular metallic surface of the container, said tag holder comprising:

a circular-shaped non-conductive member having an undersurface and a downwardly-depending flange contiguous with said undersurface defining a recess, said security tag being secured to said undersurface; and wherein said downwardly-depending flange comprises and outer edge that receives the periphery of the circular metallic surface of the container.

18. The security device of claim 17 wherein said security tag is circular-shaped.

19. The security device of claim 18 wherein said security tag comprises a circular coil.

20. The security device of claim 19 wherein said security tag comprises a pair of capacitors coupled to each end of said coil.

21. The security device of claim 17 further comprising a circular-shaped non-conductive insert that is positioned within said recess.

22. A method of tagging a container with a security tag, the container having a circular metallic surface, said method comprising:

providing a circular-shaped security tag that responds to a magnetic or an electromagnetic field of a particular frequency or frequencies;

disposing said security tag between two members of non-conductive material to form a tag holder; and coupling said tag holder to the periphery of the circular metallic surface for maintaining said security tag at a predetermined distance away from the circular metallic surface.

23. The method of claim 22 wherein said step of coupling said tag holder comprises disposing said tag at least approximately 1 cm from the circular metallic surface.

24. The method of claim 22 wherein said step of disposing said security tag between two members of non-conductive material comprises positioning said security tag between an undersurface of a non-conductive cap-like structure and a non-conductive insert.

25. The method of claim 24 wherein said step of positioning said security tag between the undersurface of a non-conductive, cap-like structure and a non-conductive insert comprises threadedly engaging said insert within said cap-like structure.

26. The method of claim 24 wherein said disposing said security tag between two members of non-conductive material comprises adhesively securing said security tag to said undersurface.

27. The method of claim 24 wherein said disposing said security tag between two members of non-conductive material comprises positioning said security tag within a recess defined by a projection extending inwardly from a sidewall of said cap-like structure.

28. The method of claim 22 wherein said step of disposing said security tag between two members of non-conductive material comprises positioning said security tag on an undersurface of a non-conductive planar element that is received within an upper recess of a non-conductive member.

29. The method of claim 28 further comprising the step of providing indicia on an exposed surface of said non-conductive planar element, said exposed surface being opposite said undersurface.

* * * * *